United States Patent Office 3,183,263
Patented May 11, 1965

3,183,263
METHOD FOR CHANGING THE CRYSTAL HABIT OF MONO-SODIUM GLUTAMATE
John A. Frump, Terre Haute, Ind., assignor to Commercial Solvents Corporation, a corporation of Maryland
No Drawing. Filed Oct. 19, 1962, Ser. No. 231,844
8 Claims. (Cl. 260—534)

This invention relates to a method for changing the crystal habit of monosodium glutamate (MSG).

MSG, an amino-acid salt, is of importance as a flavor enchancing material for foods and is frequently mixed with other food ingredients in dry, powdered form. Ordinarily this product is derived from plant materials by hydrolysis, fermentation, etc., in the form of an aqueous solution from which the crystalline salt is recovered by causing the solution to be supersaturated, as by removal of water or lowering of the temperature. As conventionally recovered from the substantially pure solution of monosodium glutamate, however, the MSG crystals are needle-like, that is, they have a length-to-diameter (L/D) ratio of about 10/1 to 15/1. This is often not a desirable shape for forming dry mixtures of non-separating characteristics.

In this invention, it was surprisingly found that by incorporating a small amount of lysine in the MSG solution before crystallization, MSG crystals having an L/D ratio less than 10/1 can be obtained. This is particularly surprising since other alpha amino acids for instance glycine, leucine, tyrosine, cystine, serine and phenylalanine were found to be unsatisfactory in this respect.

The lysine is incorporated, e.g., by adding in the MSG solution in amounts sufficient to give the desired L/D ratio in the crystals. The monosodium glutamate crystals desired from such a solution are short and stout, having an L/D ratio smaller than about 10/1, for instance an L/D ratio less than about 8/1, preferably about 1/1 to 4/1. Generally, at least about 0.01 to 2 percent or more of lysine, preferably about 0.03 to 1.5 percent, based on dry MSG in the solution, is provided, e.g., dissolved, in the solution and usually there is no advantage in using more than about 2%.

The MSG-containing solution is generally an aqueous solution with a pH generally of about 6.5 to 8.0 and preferably from about 6.8 to 7.2 at the time of crystallization. It can be one prepared by converting glutamic acid, derived from a fermentation medium and in an aqueous slurry, to MSG by providing sodium ions in the slurry, for instance by the addition of NaOH to the slurry. The MSG so formed dissolves in the water to form an aqueous solution the pH of which can be adjusted, for instance by the addition of a basic compound, e.g., NaOH, to the solution. The lysine can then be provided in the solution, for instance, by addition to the solution.

The MSG-containing solution is supersaturated to crystallize MSG. Supersaturation of an MSG solution employed in connection with the present invention can be effected in any suitable manner. For instance, water can be removed (e.g., evaporated) from the solution, an MSG "insolubilizing agent" can be incorporated (e.g., added) into the solution, or a combination of evaporating water from, and adding an insolubilizing agent to, the solution can be employed to supersaturate the solution.

An MSG "isolubilizing agent" is any liquid, water-miscible compound in which MSG is less soluble than it (MSG) is in water and which agent will decrease the solubility of MSG in solution to supersaturate or aid in supersaturating the solution and thus crystallize or enhance the crystallization of MSG. Generally, the insolubilizing agent can be incorporated into the solution in amounts up to about 80 volume percent, for instance amounts from about 0.001 or 10 to about 50 volume percent. Suitable insolubilizing agents include aliphatic oxygen compounds, for instance lower alkanols containing from 1 to 3 carbon atoms such as methanol, ethanol, propanol and isopropanol; lower alkyl carbonyl compounds such as acetone and methyl ethyl ketone; and their mixtures. The insolubilizing agent can advantageously be added to the MSG solution, preferably heated for instance to about 50° C. or 60° C., in increments by initially adding half of the total amount of the insolubilizing agent to be added and thereafter slowly adding the remainder of the insolubilizing agent while maintaining the temperature of, and agitating (e.g., stirring), the solution to avoid the formation of undesirable, non-crystalline MSG materials.

The following examples of the process of this invention are illustrative only and should not be considered limiting. The MSG solution used in the examples was formed at 50° C. from water and 99+% pure monosodium glutamate derived from a fermentation medium. The starting solution contained about 50% by weight of MSG.

Example I

To 200 g. of the MSG solution described, in a 250 ml. Erlenmeyer flask at 50° C. was added 0.50 g. lysine. The flask was sealed and placed on a "wrist action shaker" where it was allowed to agitate (for about 24 hours) until crystals formed and the temperature was about 24–28° C. The crystal slurry was filtered and the crystals washed with a mixture of ethanol and water. The dry crystals were examined under a microscope and they had a length to diameter ratio of about 1/1 to 3/1. When this run was repeated, omitting the lysine, the MSG crystals had an L/D ratio of about 10/1 to 15/1.

Example II

This run was conducted exactly as was Example I, except 1.00 g. of lysine was added to 200 g. of the 50% MSG solution. The MSG crystals were almost identical to those of Example I.

Example III

In this example, the apparatus used consisted of a 2-neck liter flask, having an outlet with stopcock at the bottom for taking off crystal slurry. The aqueous feed solution was added continuously in one neck from a dropping funnel and the other neck was connected through a water condenser to a vacuum source. The temperature was maintained at 50° C. to 55° C. and the pressure was reduced to 100 mm. Hg within the flask to evaporate water. The feed was 2 liters of a 40% by weight aqeuous solution of MSG in which had been dissolved about 6.5 g. lysine. About 900 ml. of this solution was poured into the flask before the run began and the balance of the solution was added slowly through a dropping funnel while the material in the crystallizer was concentrated at about 50–55° C. and about 100 mm. Hg. The rate of feed addition and water removal was regulated to maintain a constant operating level in the crystallizer. Agitation was obtained by bleeding air into the bottom of the crystallizer. MSG crystal slurry was removed periodically and filtered. The crystals were washed first with ethanol-$H_2O$ 1/1, then with ethanol-$H_2O$ 2/1, followed with ethanol-$H_2O$ 3/1, and finally with straight ethanol. After drying, the crystals were examined under the microscope. The length to diameter ratio was about 1/1 to 4/1 with most being about 2/1.

This run was repeated, except lysine was omitted. The MSG crystals had a length to diameter ratio of about 10/1 to 15/1.

Example IV

An MSG solution can be prepared and the present invention can be practiced by the following procedure.

A sufficient amount of water is added to 700 grams of glutamic acid in a vessel to form a slurry. A 50% solution of sodium hydroxide is added to the slurry to convert glutamic acid to MSG and provide a solution with a pH of 6.8 to 7.2. 1.5 grams of lysine are added to the solution followed by the addition of water to provide an MSG solution with a volume of 2000 mls.

The solution is heated to evaporate water and supersaturate the solution, and the solution is agitated and cooled to crystallize MSG to provide MSG crystals with an L/D ratio of about 2.5/1.

Example V

The procedure of Example IV is followed except 2 parts by weight of ethanol to 1 part by weight of MSG in solution is added to the solution to aid in supersaturating the solution.

Example VI

The procedure of Example V is followed except acetone is used as the MSG insolubilizing agent in place of the ethanol.

It can thus be seen that the method of this invention provides for alteration of the crystal properties of monosodium glutamate crystallized from an aqueous solution although it will be apparent to those versed in this art that other than aqueous solutions may be used.

It is claimed:

1. In a method for the production of monosodium glutamate crystals from a solution of said salt by causing said solution to be supersaturated with respect to monosodium glutamate to crystallize the monosodium glutamate, the improvement which comprises crystallizing monosodium glutamate in the presence of an amount of lysine in the solution sufficient to change the crystal habit of the monosodium glutamate crystals.

2. The method of claim 1 wherein the solution is an aqueous solution and lysine is present in an amount sufficient to provide monosodium glutamate crystals having a length to diameter ratio no greater than about 8/1.

3. The method of claim 1 wherein the amount of lysine is from about 0.01 to 2% based on the dry monosodium glutamate in solution and the solution has a pH from about 6.5 to 8.

4. In a method for the production of monosodium glutamate crystals from an aqueous solution of said salt by causing said solution to become supersaturated with respect to monosodium glutamate to crystallize monosodium glutamate, the improvement which comprises incorporating a liquid, water-miscible monosodium glutamate insolubilizing agent in the solution and crystallizing monosodium glutamate in the presence of an amount of lysine in the solution sufficient to change the crystal habit of the monosodium glutamate crystals.

5. The method of claim 4 wherein the amount of lysine in the solution is from about 0.01 to 2% based on the dry monosodium glutamate in solution and the pH of the solution is from about 6.5 to 8.

6. The method of claim 5 wherein the insolubilizing agent is a lower alkanol.

7. The method of claim 6 wherein the lower alkanol is ethanol.

8. The method of claim 4 in which the insolubilizing agent is an aliphatic oxygen compound having from 1 to 3 carbon atoms.

References Cited by the Examiner
UNITED STATES PATENTS 2,306,646　12/42　Shildneck _____ 260—534
2,834,805　5/58　Purvis _____ 260—534

LORRAINE A. WEINBERGER, *Acting Primary Examiner.*

LEON ZITVER, *Examiner.*